Oct. 10, 1939.                    E. FISCHEL ET AL                    2,175,627
           DISENGAGING MEANS FOR AUTOMATIC CONTROL SYSTEMS FOR AIRCRAFT
                        Filed June 11, 1938          2 Sheets-Sheet 1

INVENTOR.
Eduard Fischel
Gerald Klein
BY
Stephen Cerstvik
ATTORNEY.

Oct. 10, 1939.   E. FISCHEL ET AL   2,175,627
DISENGAGING MEANS FOR AUTOMATIC CONTROL SYSTEMS FOR AIRCRAFT
Filed June 11, 1938   2 Sheets-Sheet 2
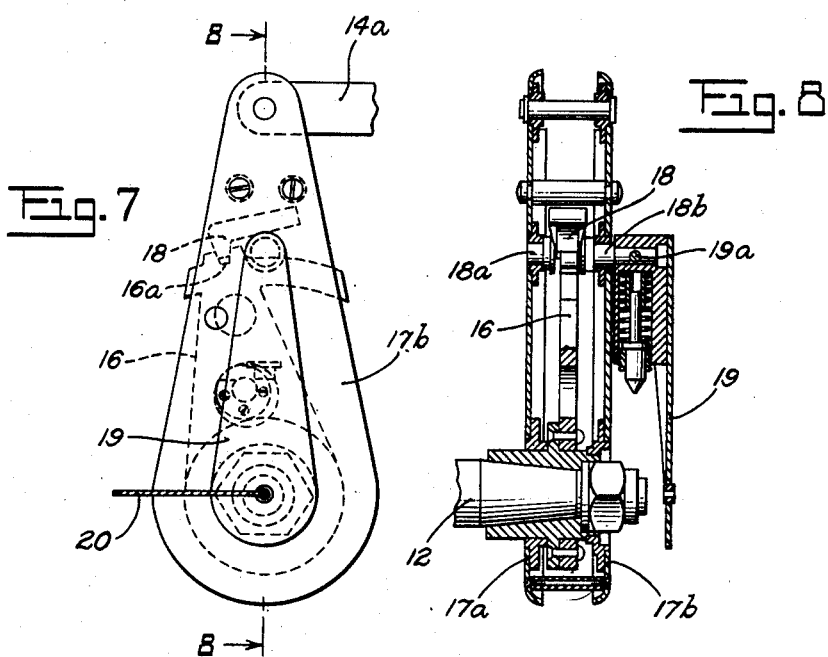
INVENTORS.
Edward Fischel
Gerald Klein
BY Stephen Gerstvik
ATTORNEY.

Patented Oct. 10, 1939

2,175,627

UNITED STATES PATENT OFFICE 2,175,627

DISENGAGING MEANS FOR AUTOMATIC CONTROL SYSTEMS FOR AIRCRAFT

Eduard Fischel, Berlin-Charlottenburg, and Gerald Klein, Berlin-Dahlem, Germany, assignors to Siemens Apparate und Maschinen Gesellschaft mit beschrankter Haftung, Berlin, Germany, a corporation of Germany Application June 11, 1938, Serial No. 213,301
In Germany June 12, 1937

6 Claims. (Cl. 192—48)

This invention relates to disconnecting apparatus and more particularly to disengaging means for automatic control systems for aircraft.

It is desirable in automatic control apparatus for aircraft to interpose between the device and the control surfaces connected thereto suitable clutch means for selectively engaging or disengaging the device, and also an emergency coupling which may rapidly and positively disconnect the entire apparatus from said surfaces. In devices heretofore proposed of this character, both the clutch and emergency coupling have been governed by separate control means.

One of the objects of the present invention is to provide novel means of the above character wherein both a clutch and a coupling may be governed by a common control member.

Another object is to provide novel means of the above character for governing the order of the action of a clutch and a disconnecting coupling.

A further object is to provide novel means of the above character wherein a clutch and an emergency coupling may be rapidly disengaged in the order named by a thrust acting in one direction.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views:

Fig. 7 is a side elevation of the emergency coupling; and

Fig. 8 is a section taken on the line 8—8 of Fig. 7.

The form of the invention illustrated in the accompanying drawings, by way of example, is a device for governing from a common control member both a clutch and an emergency coupling which are interposed between an automatic pilot apparatus and a control surface for an aircraft. The clutch member comprises a conventional magnetic device which, when deenergized, permits the transmission of torsional moments. The emergency coupling is a mechanical device which may be constituted by a suitable latch coupling. A common control member is provided for the clutch and coupling which is adapted for both angular and longitudinal displacement. Means are associated therewith which energize or deenergize the magnetic coupling as the control member is angularly shifted and which disconnect the mechanical coupling when the member is longitudinally withdrawn from an initial position.

Figure 1:
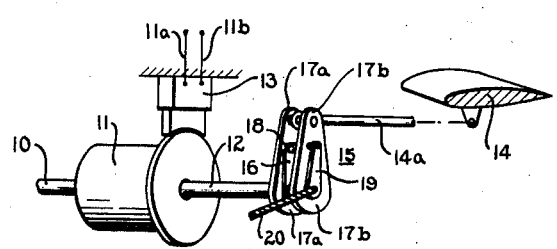
Fig. 1 is a perspective view of a clutch and an emergency coupling member employed in the present invention.

In Fig. 1, a servo-motor (not shown), for example, of an automatic pilot apparatus is connected to a shaft 10 which is connected through a conventional selectively engageable and disengageable magnetic clutch 11 to a shaft 12. Clutch 11 is connected through leads 11a, 11b upon an electro-magnet 13 forming a part thereof, to a suitable source of energy and to a switch to appear later. Shaft 12 is operatively connected to a control surface 14 by means of a rod 14a operatively connected to an emergency coupling 15 which may be of the type disclosed in the copending application of Hans Werner Tiebel, Serial No. 171,342, filed October 27, 1937, and comprising two levers which are both angularly shiftable about the axis of shaft 12. One of these levers 16 (see Figs. 7 and 8) is keyed to shaft 12 between the parts of the second lever comprising a pair of firmly connected parallel arms 17a and 17b and which are pivotally mounted upon shaft 12. These levers are interconnected by means of a latch 18 which is pivotally mounted by journals 18a and 18b upon the second lever and adapted for engaging a toothed portion 16a of lever 16. An arm 19 is attached to shaft 19a connected to one of the journals 18b by which the latch is pivotally mounted whereby the latch may be disengaged by angularly shifting said arm by means of a wire 20 attached to the free extremity thereof.

An embodiment of the common or joint control member for both couplings is shown in Figs. 2 to 5. The control member is constituted by a switch having a shaft 21 within a housing 22 which has an end covering 23 through which shaft 21 extends. A handle 24 is rigidly secured to the extending portion of said shaft and is provided with a pointer 24a which is adapted for indicating the angular positions of the shaft, i. e., the "on" and "off" positions, against suitable fixed markings 23b, 23a, respectively, upon the covering 23. Shaft 21 is adapted for both longitudinal and angular displacement in housing 22 and is secured against unintentional longitudinal displacement by a groove lock comprising a ball 25 which, under pressure of a spring 26, engages an annular groove 27 upon said shaft. Mounted upon shaft 21 is a switch lever 28 which is provided with a key 28a engaging a longitudinal groove or keyway 21a in the shaft. Lever 28, therefore, may transmit only rotary movements and not longitudinal movements of the shaft, said lever being prevented from moving longitudinally by sleeves 22a, 22b of housing 22. Rotatably mounted between a bifurcated extremity of lever 28 is a roller 29 which upon rotation of shaft 21 is engageable with a bifurcated extremity of an arm 30 which controls an electric switch 31 for the magnet 13 of clutch 11. To an extremity of shaft 21 which extends through the rear of housing 22, the wire 20 is attached by means of a cap nut 32. Between the "off" and "on" positions illustrated, an intermediate or "stand-by" position (not shown) may be provided. The handle must be moved at first from the "off" into the "stand-by" position when, for example, the power means or the servo-motor for governing the control surface is energized, or the navigation instruments necessary for the automatic control system are placed in operation. The clutch may then be closed by movement to the "on" position.

Figure 2:
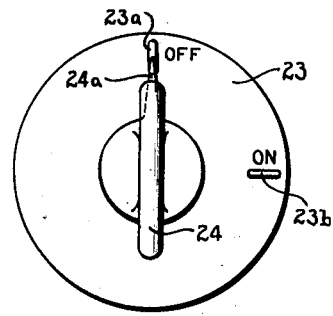
Fig. 2 is a top elevation of one embodiment of the invention.
Figure 3:
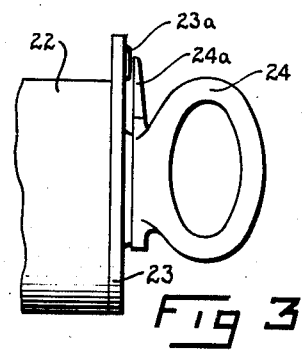
Fig. 3 is a side elevation, with parts broken away, of the embodiment of Fig. 2.
Figure 4:
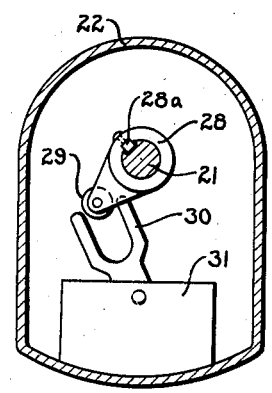
Fig. 4 is a cross-sectional view taken along line IV—IV of Fig. 5.
Figure 5:
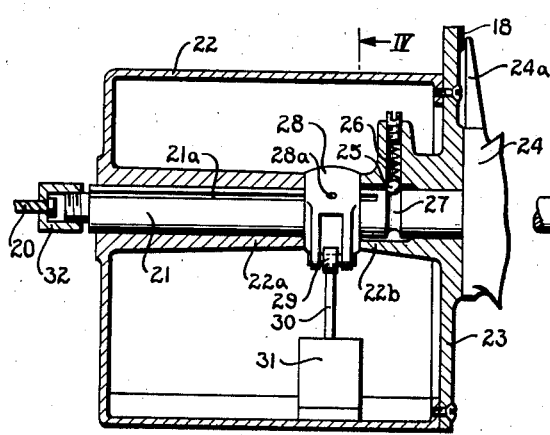
Fig. 5 is a side elevation, partly in section, of the invention.

In operation, if the control surface 14 is being controlled by an automatic apparatus which is connected to shaft 10 and it is desired to disengage temporarily said apparatus, the handle 24 is moved from the "on" position to the position as shown in Fig. 2 A turning moment is transmitted to lever 28 by shaft 21 and hence to arm 30 which actuates a switch which, in turn, energizes electromagnet 13 and disengages clutch 11. The reverse of this process, of course, will reengage the clutch. If the pilot is forced, due to failure of the automatic control system, to place the latter out of operation in order to avoid a dangerous situation, the handle 24 is pulled outwardly. The longitudinal displacement of shaft 21 will, by means of wire 20, trip the latch of the emergency coupling 15 and disengage same thus freeing the control surface.

Figure 6:
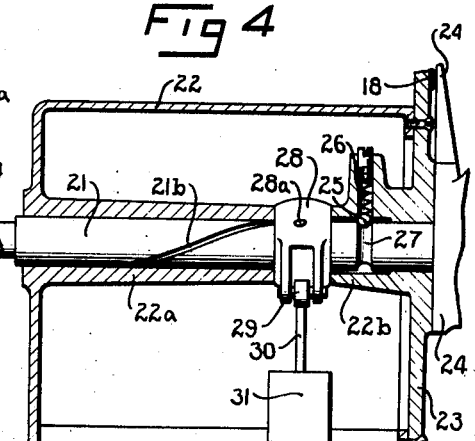
Fig. 6 is a side elevation, partly in section and with parts broken away, of a second embodiment of the invention.

In apparatus of this type, it may be desirable, in order to facilitate a quicker disengagement, that both the clutch and coupling be disengaged by a single movement, i. e., movement in a single direction, rather than by a combination of longitudinal and rotary movements. This rapid disengagement should be accomplished, preferably such that the clutch and coupling be disengaged in the order named. This is accomplished in the embodiment shown in Fig. 6 which is identical to that of Figs. 2 to 5 with the exception that a keyway 21b, analogous to keyway 21a, instead of being straight is cut in the form of a helix, i. e., a screw thread.

In the operation of this embodiment, if it becomes necessary in an emergency to free the control surface immediately, the handle 24 being in the "on" position is pulled outwardly. The screw action of the helical keyway 21b causes lever 28 to be angularly shifted to move arm 30 and to disengage clutch 11. Immediately thereafter the longitudinal displacement of shaft 21 will disengage coupling 15 and complete the disconnection of the control surface.

There is thus provided a novel common control member for a combination clutch and coupling. The device may be rapidly operated by a single movement and requires no concentration and very little thought in order to successfully actuate the same. The apparatus is positive in operation and provides a common manually operable member for selectively actuating either said clutch or coupling.

Although only two embodiments of the invention are illustrated and described in detail, it is to be expressly understood that the invention is not limited thereto; for example, there have been selected for use in association with the invention, a magnetic and a mechanical coupling. However, any other suitable types of couplings may be employed. Various changes may also be made in the design and arrangement of the parts without departing from the spirit and scope of the invention, as the same will now be understood by those skilled in the art. For a definition of the limits of the invention, reference will be had primarily to the appended claims.

What is claimed is:

1. The combination with a selectively engageable and disengageable clutch of an emergency coupling, common means for selectively actuating either said clutch or said coupling, said means being adapted for disengaging both clutch and coupling, in the order named, by a displacement thereof in a single direction.

2. In apparatus of the class described, a clutch, a coupling, a control member having a shaft adapted for both longitudinal and angular displacement, said member including means for actuating said clutch by said angular displacement, and means for actuating said coupling by said longitudinal displacement.

3. The combination with a clutch and a coupling of a common control device therefor comprising a manually operable longitudinally and angularly displaceable member, means for disengaging both said clutch and coupling when said member is longitudinally displaced, said means being adapted for actuating only said clutch when said member is angularly displaced.

4. The combination with a clutch and a coupling of a lever operatively connected to said clutch, said lever being mounted upon a longitudinally displaceable and angularly shiftable shaft, the latter being operatively connected to said coupling, and means for yieldingly retaining said shaft in a predetermined position.

5. The combination with a clutch and a coupling of a shaft having a helical keyway, a lever mounted upon said shaft having a key fitting in said keyway, said shaft being adapted for both angular and longitudinal displacement, means for operatively connecting said lever and said clutch, and means operable when said shaft is longitudinally displaced for disengaging said coupling.

6. In apparatus of the class described, a clutch, a coupling, common control means therefor comprising a shaft adapted for longitudinal and angular displacement, means for actuating said clutch by said angular movement of the shaft, means for disengaging said coupling by the longitudinal movement of the shaft, and means for indicating the angular position of the shaft.

EDUARD FISCHEL.
GERALD KLEIN.